United States Patent
Reus et al.

(10) Patent No.: US 8,756,318 B1
(45) Date of Patent: Jun. 17, 2014

(54) SOFTWARE DEPLOYMENT USING CLIENT LOCATION

(75) Inventors: Edward Reus, Woodinville, WA (US);
Jianbo Hou, Issaquah, WA (US);
Jefferson Davis, Sammamish, WA (US);
Jimin Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 11/869,104

(22) Filed: Oct. 9, 2007

(51) Int. Cl.
*G06F 15/173* (2006.01)

(52) U.S. Cl.
USPC .......................... 709/225; 717/177; 709/217

(58) Field of Classification Search
USPC ....................................................... 709/201
See application file for complete search history.

(56) References Cited

U.S. PATENT DOCUMENTS

| | | | |
|---|---|---|---|
| 5,978,916 A * | 11/1999 | Randall | 726/26 |
| 6,671,695 B2 * | 12/2003 | McFadden | 707/102 |
| 6,833,787 B1 | 12/2004 | Levi | |
| 6,928,481 B1 | 8/2005 | Harris et al. | |
| 7,062,572 B1 | 6/2006 | Hampton | |
| 7,088,237 B2 | 8/2006 | Arcens | |
| 7,181,512 B1 * | 2/2007 | Lesher et al. | 709/223 |
| 7,555,551 B1 * | 6/2009 | McCorkendale et al. | 709/225 |
| 8,201,164 B2 * | 6/2012 | Reus et al. | 717/177 |
| 2002/0116698 A1 * | 8/2002 | Lurie et al. | 717/100 |
| 2002/0132616 A1 | 9/2002 | Ross et al. | |
| 2002/0143991 A1 * | 10/2002 | Chow et al. | 709/245 |
| 2002/0188842 A1 * | 12/2002 | Willeby | 713/154 |
| 2003/0061323 A1 * | 3/2003 | East et al. | 709/223 |
| 2003/0066065 A1 * | 4/2003 | Larkin | 717/177 |
| 2003/0099202 A1 * | 5/2003 | Lear et al. | 370/238 |
| 2004/0019889 A1 * | 1/2004 | Melchione et al. | 717/177 |
| 2004/0031028 A1 | 2/2004 | Hunt et al. | |
| 2004/0083307 A1 | 4/2004 | Uysal | |
| 2004/0117461 A1 * | 6/2004 | Nakayama et al. | 709/219 |
| 2004/0193702 A1 * | 9/2004 | Osborne et al. | 709/220 |
| 2005/0021738 A1 * | 1/2005 | Goeller et al. | 709/224 |
| 2005/0027846 A1 * | 2/2005 | Wolfe et al. | 709/223 |
| 2005/0050538 A1 * | 3/2005 | Kawamata et al. | 717/168 |
| 2005/0097549 A1 | 5/2005 | Chu et al. | |
| 2005/0120040 A1 * | 6/2005 | Williams et al. | 707/102 |
| 2005/0144298 A1 * | 6/2005 | Samuel et al. | 709/230 |
| 2005/0195960 A1 * | 9/2005 | Shaffer et al. | 379/265.02 |
| 2006/0047775 A1 * | 3/2006 | Bruck et al. | 709/217 |
| 2006/0059100 A1 | 3/2006 | Ronning et al. | |
| 2006/0075001 A1 * | 4/2006 | Canning et al. | 707/203 |
| 2006/0101449 A1 | 5/2006 | Gatz | |
| 2006/0123040 A1 * | 6/2006 | McCarthy et al. | 707/102 |

(Continued)

OTHER PUBLICATIONS

Andersson,"A Deployment System for Pervasive Computing", Proceedings of the International Conference on Software Maintenance (ICSM'00), 2000, pp. 10.

*Primary Examiner* — Hamza Algibhah
(74) *Attorney, Agent, or Firm* — Michael B Dodd; Dodd Law Group

(57) ABSTRACT

A software distribution mechanism evaluates network addresses of requesting clients to determine a location for each client. The clients from a particular location are grouped together and a fraction of those clients in a particular group are recipients of a software distribution. The faction is adjusted to enable more or fewer clients to download, thus effectively throttling the amount of bandwidth consumed by a mass distribution event. The fraction may be adjusted for particular geographical locations and the time of day to make more effective use of network bandwidth.

18 Claims, 4 Drawing Sheets

(56) References Cited

U.S. PATENT DOCUMENTS

| | | | |
|---|---|---|---|
| 2006/0167725 A1* | 7/2006 | Grunspan et al. | 705/5 |
| 2006/0248116 A1* | 11/2006 | Sobel | 707/104.1 |
| 2007/0094658 A1* | 4/2007 | DiCarlo et al. | 717/178 |
| 2007/0169073 A1* | 7/2007 | O'Neill et al. | 717/168 |
| 2007/0220510 A1* | 9/2007 | Bell et al. | 717/174 |
| 2008/0037536 A1* | 2/2008 | Padmanabhan et al. | 370/389 |
| 2008/0065691 A1* | 3/2008 | Suitts et al. | 707/104.1 |
| 2008/0109540 A1* | 5/2008 | Rogers et al. | 709/222 |
| 2009/0007091 A1* | 1/2009 | Appiah et al. | 717/171 |
| 2009/0017812 A1* | 1/2009 | Chan et al. | 455/419 |
| 2009/0024993 A1* | 1/2009 | Reus et al. | 717/177 |
| 2009/0077549 A1* | 3/2009 | Sadja et al. | 717/178 |
| 2009/0094248 A1* | 4/2009 | Petersen | 707/10 |

\* cited by examiner

SOFTWARE DEPLOYMENT USING CLIENT LOCATION

BACKGROUND

Distribution of software across the Internet can take a large toll on Internet bandwidth, especially when many clients download software at the same time. For very large distributions of software, such as updates to various applications and operating systems that may have hundreds of millions of client devices that each download many megabytes or even gigabytes of data, the sheer volume of downloaded data may use an extremely large amount of Internet bandwidth.

SUMMARY

A software distribution mechanism evaluates network addresses of requesting clients to determine a location for each client. The clients from a particular location are grouped together and a fraction of those clients in a particular group are recipients of a software distribution. The faction is adjusted to enable more or fewer clients to download, thus effectively throttling the amount of bandwidth consumed by a mass distribution event. The fraction may be adjusted for particular geographical locations and the time of day to make more effective use of network bandwidth.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
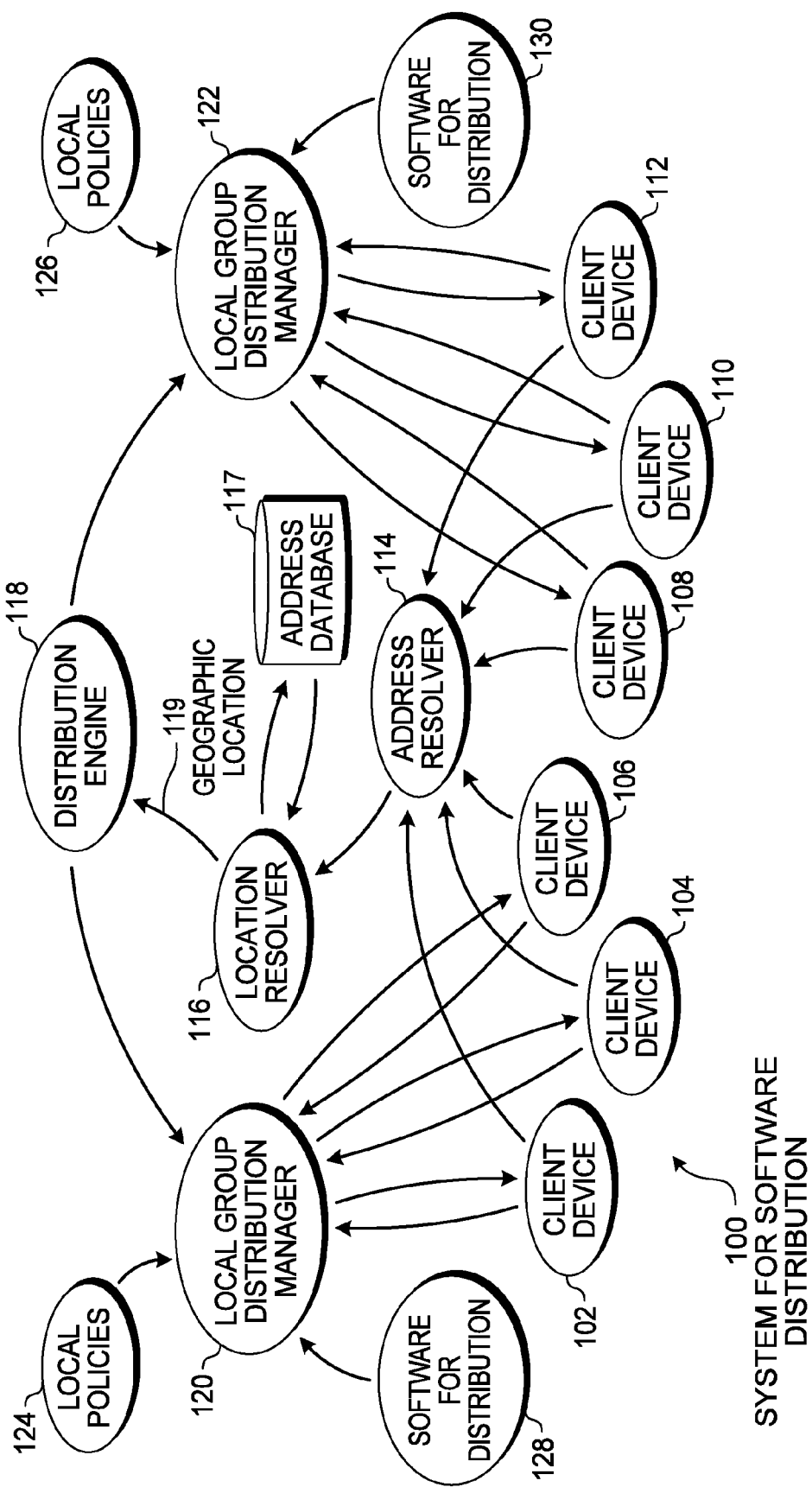
FIG. 1 is a diagram illustration of an embodiment showing a system for software distribution.

A software distribution system may resolve a geographic location from a network address and use the geographic location in metering or controlling software distributions to client devices. Each client or requester may be able to receive a software distribution based on policies applied to groups established for various geographic locations.

In an example use of an embodiment, a worldwide software distribution may be performed by grouping each client into groups defined by continents or time zones. During the course of a day, those clients in a nighttime location may be permitted to receive a software distribution while clients in a daytime location may be restricted from the distribution. Such an embodiment may make use of the fact that bandwidth is more available during nighttime than daytime.

Each group may have a mechanism for permitting distribution to a fraction of the client devices. One mechanism may be to assign a random number to each client device, producing a random distribution of devices. An allocation fraction may be set for the group that defines the fraction of devices that may receive the distribution. The allocation fraction may be used to select those devices with a random number below a certain number and commence the distribution. Over time, the allocation fraction may be increased so that each group member may eventually receive the distribution.

One of the benefits of a software distribution system is that network bandwidth and server capacity may not be overwhelmed by a large number of requests or large sized distributions. The allocation mechanism may be capable of increasing and decreasing the number of clients being serviced, enabling dynamic control over the distribution.

A software distribution may be any type of computer data that may be distributed to client devices. For example, operating system and application updates may be periodically distributed to client devices. In some instances, a software distribution may be in the form of data, while in other instances, a software distribution may be in the form of executable code. Some embodiments may have an executable installer on each client that accepts the distribution and installs the distribution on the client device.

The software distribution may be performed in many different manners. In some cases, a client device may download a distribution in a pull-type arrangement. In other cases, a server device may push a distribution to the client device. Other systems may use other mechanisms, protocols, and techniques for transferring a software distribution from servers to clients.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for software distribution. Embodiment 100 is a functional illustration of various components that may make up a software distribution system. In some embodiments, several of the functional aspects illustrated may be performed on a single device having a processor and adapted to perform each function. In other embodiments, some of the individual functional aspects may be performed by different devices. Some such embodiments may have several devices that are used to perform one specific function or a subset of a function. For example, a cluster of server devices may be used to perform one specific function.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various components described.

Embodiment 100 illustrates a system for software distribution. After an initial connection, a client's address may be used to determine a geographic location for the client. Based on the geographic location, the client may be assigned to various local group distribution managers that may be servers which perform the software distribution transfer to the client devices.

Multiple client devices 102, 104, 106, 108, 110, and 112 may connect to an address resolver 114 during an initial step of receiving a software distribution. The address resolver 114 may determine a network address from the client. In many cases, the network address may be an Internet Protocol or IP address.

The location resolver 116 may use an address database 117 to determine a geographic location 119 of the individual clients. Various embodiments may be able to resolve a client's geographic location with different resolutions. In some cases, the location resolver 116 may be able to resolve a location down to a country or broad geographic region. In other cases, the location resolver 116 may be able to resolve the location down to a state, city, or municipality. In still other cases, the location resolver 116 may be able to identify a client's internet service provider and an approximate street address.

Various mechanisms may be used to resolve a location from an address. In cases where a gross location may be used, such as determining a continent on which an address may be located, the address database 117 may be compressed or summarized so that fast and efficient lookups may be performed. When searching for more detailed location information, a more detailed address database 117 may be used.

Some embodiments may be used for metering bandwidth and server capacity for a distribution server. In such embodiments, the location determination may be approximated with enough accuracy so that the distribution server is not overloaded with requests or so that bandwidth is consumed in a controlled manner.

For example, a server located in North America may be configured to perform software distribution during periods of low network traffic, such as between midnight and 5:00 am Eastern time. When a request from a client device is received, the location may be determined to be somewhere within North America and the request may be routed to a distribution server within North America.

In some instances, the location resolver 116 may incorrectly determine that a client device is within North America when the client device is actually in Europe or some other geographic region. For those devices with incorrectly determined location, the distributed software may be routed from the North American server and reach the device across an intercontinental connection. In another instance, an IP subnet may fall across states or even country borders. When the location resolver 116 determines that an address is within the subnet, the location resolver 116 may or may not be able to determine on which side of the border the actual device resides. In many embodiments, the inaccuracy of location detection may be offset by the speed in which location may be determined.

Other embodiments may use location determination to tailor the content of the software distribution. In such embodiments, the accuracy of location determination may be of higher importance and more complex and detailed location searches may be performed. Such an embodiment may download specific content to devices within a precise geographical region. For example, a governmental regulation may limit distribution of specific content to a specific geographical region. An example of such content may be encryption or security algorithms that are regulated against transmitting to specific foreign countries. Another example may be language or location specific software, where the distribution to other areas may be confusing or otherwise undesirable.

Some embodiments may use multiple databases for resolving a location for an address. A first database may be used to locate an approximate location, such as a continent, country, or state. A second group of databases may be used to locate a more precise location where the second databases may be tailored for the specific continent, country, or states.

In some embodiments, the network address may also indicate a specific internet service provider. Based on the unique characteristics of the internet service provider, a software distribution may be packaged or transmitted in a specific way that may optimize the characteristics of the specific internet service provider. In some cases, the network address may include knowledge about the speed of the connection, such as a low speed dial-in connection, a high bandwidth fiber optic connection, a wireless connection, cable modem, digital subscriber line (DSL) connection, or other type of connection. Such knowledge may be used to estimate the data transmission time and approximate the bandwidth requirements of portions of a network.

Based on the geographic location 119, a distribution engine 118 may assign the client to one of several local group distribution managers 120 or 122. The local group distribution managers 120 and 122 may coordinate software distribution to client devices within specific geographic groups. For example, local group distribution manager 120 may service client devices 102, 104, and 106 while local group distribution manager 122 may service client devices 108, 110, and 112.

Each local group distribution manager 120 and 122 may handle the distribution of software to the assigned client devices. In many embodiments, a local group distribution manager 120 or 122 may be physically located within or near the geographic location of the various clients assigned to the specific software distribution manager. In some embodiments, the group distribution managers 120 and 122 may be collocated yet may separately service devices in different geographic regions.

In some embodiments, the functions of local group distribution managers 120 and 122 may be performed by one server device or by many devices. In some embodiments, a single server device may act as a local group distribution manager for two or more different groups of clients. In other devices, clusters of servers may separately act as group distribution managers to various groups. In some embodiments, a single server may be located in a sparsely populated geographic region and perform local group distribution services, while a cluster of servers may service a more densely populated region Each local group distribution manager 120 and 122 may have a set of local policies 124 and 126 that may define the operation of each group distribution manager. The policies 124 and 126 may define any type of behavior of the local group distribution manager. In an example, the policies 124 and 126 may define the maximum bandwidth or number of connections for a server, which may also be defined with respect to time. The bandwidth or connection limitations may vary for the time of day, day of the week, or other configurations. Such a limitation may enable more connections and transfers during certain periods of time and may restrict or pause transfers during other periods.

Some policies may define a handshaking or protocol used by each local group distribution manager. One group of client devices in one locale may use one type of communication protocol while another may use a different type. Such protocol differences may include any type of difference in setting up, operating, and tearing down a communication session.

Some embodiments may be able to group certain client devices within a geographical location and within a specific type of network. For example, an internet service provider may have a block of network addresses that are used to connect many devices along a high bandwidth connection, such as a cable television connection or digital subscriber line connection. Some groups of addresses may be assigned to a particular enterprise or company. When client devices may be identified with such precision, some local group distribution managers may be adapted to apply specific policies to groups of client devices from specific internet service providers. Such a policy may define specific handshaking or communication protocols that may be used to transfer the software distribution, or may have different provisions that take advantage of features on the local network.

Some such policies may tailor the timing or bandwidth restrictions to the group of client devices to correspond with unique characteristics for the internet service provider. For example, the bandwidth availability for cable television connections may be restricted in the evening and late evening hours but less restricted during the late night and daytime hours. An internet service provider that has largely commercial clients may have restricted bandwidth during business hours but unrestricted bandwidth in the evening and nighttime hours.

The software for distribution 128 and 130 may be used by the local group distribution managers 120 and 122 to distribute to the various clients. The software may be customized or localized by the local group distribution managers 120 and 122. In some cases, the software for distribution 128 and 130 may include different versions of distributed software and the local group distribution managers 120 and 122 may select an appropriate version to distribute to a particular client device or group of client devices. In some cases, the local group distribution managers 120 and 122 may package the distributed software in a specific form by zipping, encrypting, or compressing various files together or by organizing the software in a particular form. In some cases, some clients or groups of clients may receive a subset of the software for distribution 128 and 130.

The various clients may receive distributed software using various mechanisms. In some embodiments, the clients may connect to the local group distribution manager or some other server and receive a list of available software distributions. The client may then contact the local group distribution manager 120 or 122 and request a download of all or a portion of the available software.

In other embodiments, the local group distribution managers 120 and 122 may initiate a communication session with the various client devices and transfer the distributed software using a push-type distribution mechanism.

Figure 2:
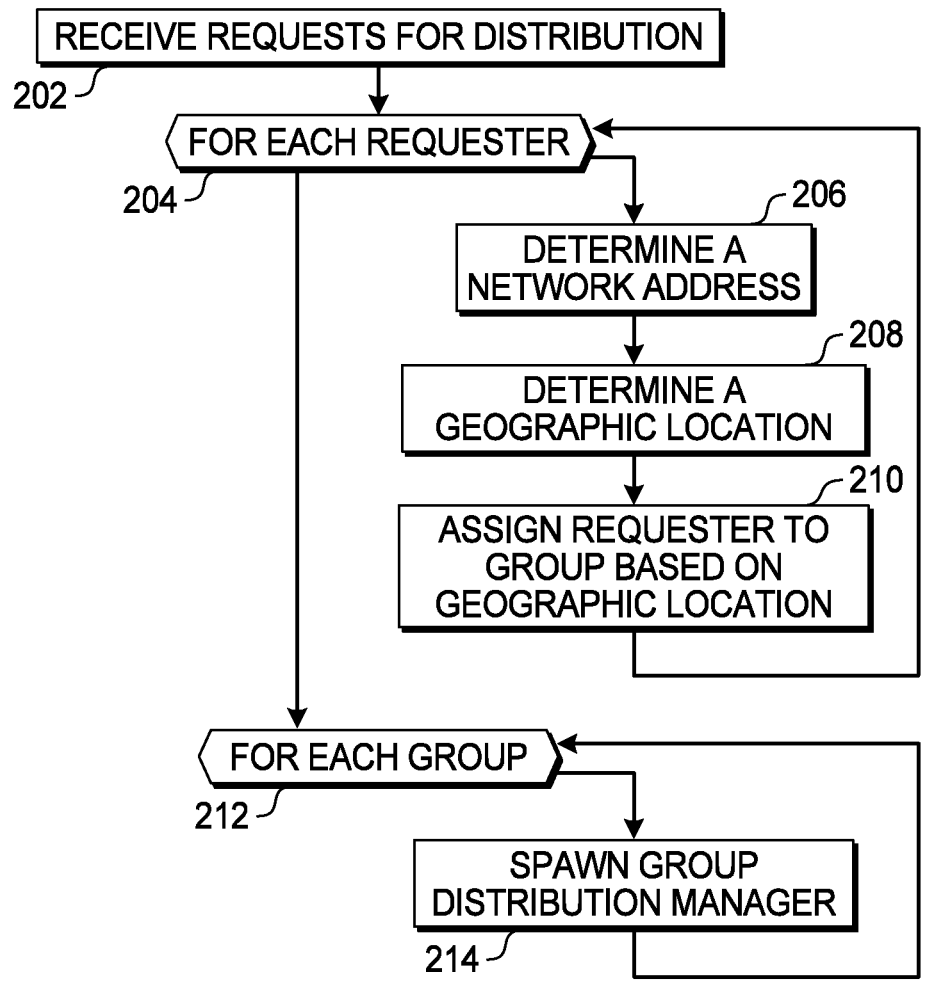
FIG. 2 is a flowchart illustration of an embodiment showing a method for grouping software requesters.

FIG. 2 is a flowchart illustration of an embodiment 200 showing a method for grouping software requesters. Embodiment 200 is an example of a method or sequence for processing a distribution request and grouping the requester. Embodiment 200 is merely one example of such a method. Other embodiments may use additional steps or may consolidate steps together, and may use different terminology or nomenclature to perform the functional steps described herein.

Requests for distribution may be received in block 202. In some cases, the requests may be sent by a device as part of a subscription service for software updates, as part of a registration and activation procedure performed during the activation of new software, or for some other procedure or reason.

For each requester in block 204, a network address may be determined in block 206 from which a geographical location may be determined in block 208. Based on the geographical location, the requester may be assigned a group in block 210.

The network address of block 206 may be an Internet Protocol or IP address. Some other address mechanism may be used in certain cases, such as an address for a connection point used by the client device.

For example, a wireless device may have the ability to connect to the Internet through many different wireless connection points. For example, a portable device may connect through a wireless connection point in a coffee shop or airport. In a communication with a group distribution manager, such a device may connect using the network address of a connection point and may not have a dedicated network address assigned to the device. In such a case, the network address of the connection point may be used to determine a geographical location.

The groups defined in block 210 may correspond with the resolution or granularity by which a location may be determined in block 208. Some embodiments may determine a location that is relatively precise, such as the street address of a device. Some embodiments may determine that a device is within a specific county, city, state, or country.

When determining a location based on a network address, a database of network addresses may be queried. In embodiments where an approximate location is used, such as a state or country, such databases may be compressed or summarized so that the queries may be performed quickly. In such cases, some accuracy may be lost during the summarization or compression and some addresses may not be correctly mapped to their actual geographic location.

After the requesters are processed in block 204, for each group in block 212, a group distribution manager may be spawned in block 214.

The group distribution manager of block 214 may communicate with the various client devices and transfer software to the client devices using various mechanisms. In some instances, the group distribution manager may be one of many processes on a distribution server that distributes software to a group of client devices.

In many embodiments, the process of receiving requests in block 202 and processing each requester in blocks 204-210 may be performed by a central server. Such a central server may be located in a company headquarters or some other centralized location and accessed by client devices from many different locations. After processing, further communications may be performed by the group distribution manager server that may be located within or near the geographical area of the assigned client devices.

Figure 3:
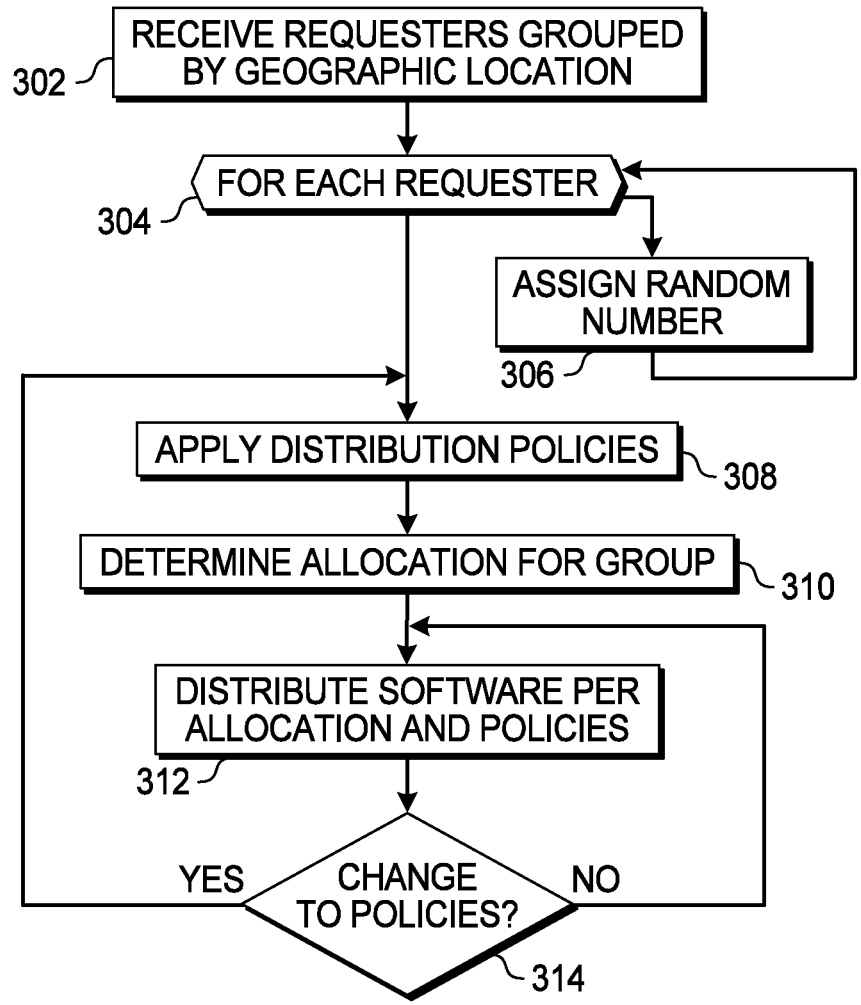
FIG. 3 is a flowchart illustration of an embodiment showing a method for distributing software based on policies.

FIG. 3 is a flowchart illustration of an embodiment 300 showing a method for distributing software based on policies. Embodiment 300 is an example of method for distributing software to a variety of requesters using a random allocation. Embodiment 300 is merely one example of such a method. Other embodiments may use additional steps or may consolidate steps together, and may use different terminology or nomenclature to perform the functional steps described herein.

The requesters for a particular geographical group may be received in block 302. For each requester in block 304, a random number may be assigned in block 306.

The random number in block 306 may be used to allocate bandwidth, communication sessions, or other factors to specific client devices and not to other client devices. In an example, each requester may be assigned an evenly distributed random number between 0 and 1. For example, in order to limit total bandwidth utilization, those requester client devices with random numbers less than 0.15 may be permitted to receive a distribution.

Each embodiment may have a different mechanism for allocating distributions, and the embodiment 300 is illustrated here as an example.

Distribution policies may be applied in block 308. In some embodiments, the distribution policies may define the timing, configuration, or other factors associated with the software distribution. In many embodiments, larger volumes of distributions may be performed at certain hours of the day and certain days of the week. In many embodiments, a limited amount of distribution may be performed during certain periods of time, such as daytime or early evening when bandwidth usage is high. In some embodiments, no distribution may be performed during such periods.

The distribution policies of block 308 may include configuration parameters for the entire group or subgroups of client devices. Such configuration parameters may include a predefined handshaking or protocol, the manner in which software may be packaged or formatted, or various options that may be specified for each client device.

The allocation for the group may be determined in block 310. The allocation may refer to a certain percentage or fraction of client devices that may be permitted to receive a distribution. In large distributions, such as operating system updates that may be received by tens or hundreds of millions of devices and may be very large distribution packages, the distributions may take place over several days, weeks, or even months, with a small fraction of devices being able to receive a distribution at a given period of time.

The software may be distributed per the allocation and policies in block 312. In many embodiments, a client device may request a distribution package and may download the package. In some cases, the download process may take several minutes or several hours or more, depending on the connection and size of the distribution. In other cases, the distribution server may contact the requester client device and transmit the distribution using a push-type distribution mechanism.

If there is a change to the policies in block 314, the process may return to block 308. In some instances, the policies may change over time. For example, during a period of high available bandwidth, a large number of client devices may begin receiving a distribution package. Even though many requesters may be in the process of receiving the distribution package, the policy may change to pause or halt ongoing distributions. In such a case, the distribution polices may be re-applied in block 308, a new allocation determined in block 310, and the software may be distributed according to the polices in block 312.

Figure 4:
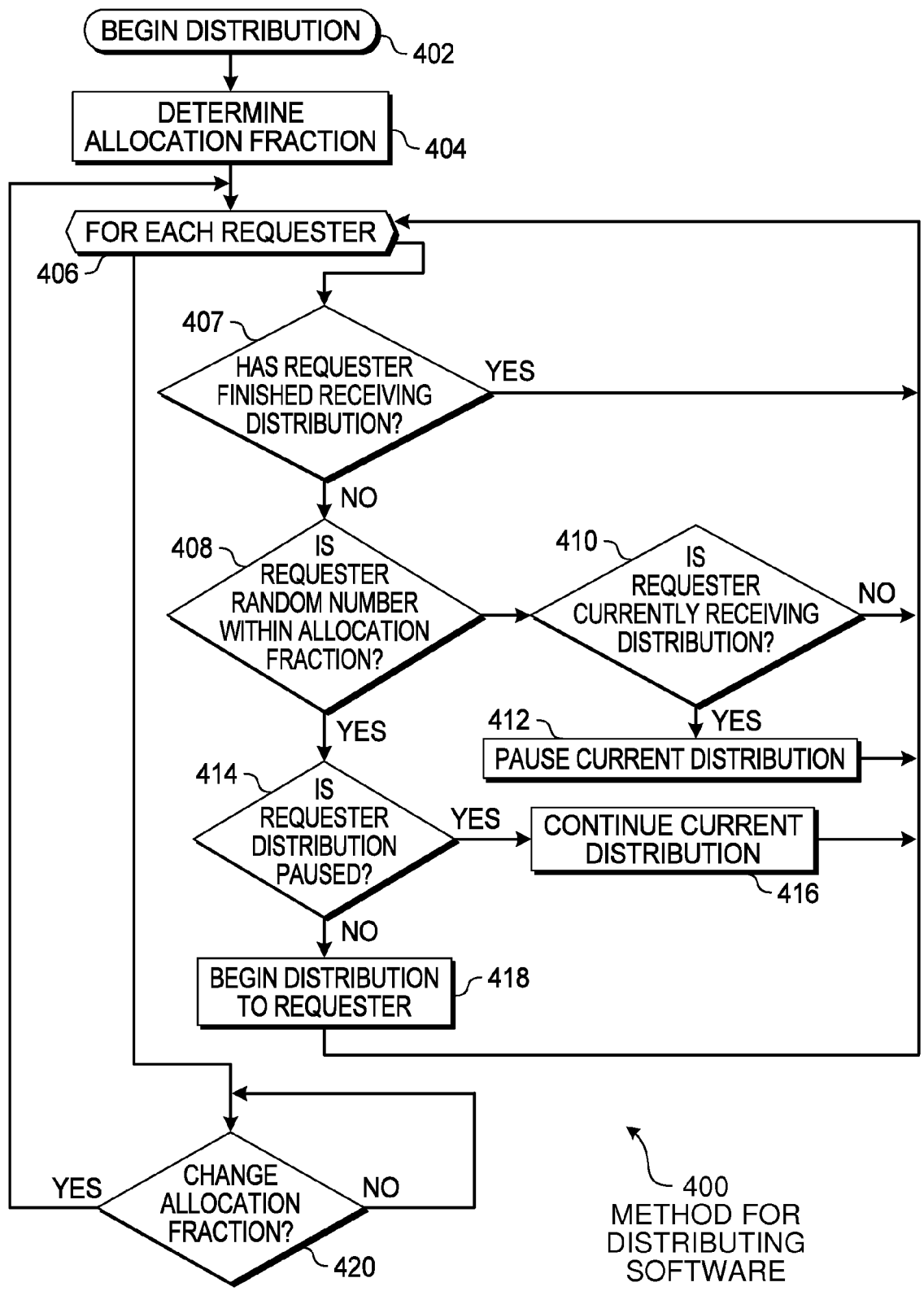
FIG. 4 is a flowchart illustration of an embodiment showing a method for distributing software.

FIG. 4 is a flowchart diagram of an embodiment 400 showing a method for distributing software. Embodiment 400 is an example of a method by which an allocation fraction may be increased or decreased and more or fewer requester or client devices may receive a software distribution. Embodiment 400 is merely one example of such a method. Other embodiments may use additional steps or may consolidate steps together, and may use different terminology or nomenclature to perform the functional steps described herein.

The distribution may begin in block 402 and the allocation fraction determined in block 404. In the initial phase of a distribution, the allocation fraction may be small and as client devices may complete the software distribution, the allocation fraction may be raised over time. In some embodiments, the allocation fraction may be raised or lowered depending on the time of day or other factors.

For each requester in block 406, if the requester has finished receiving the distribution in block 407, the requester is left unchanged. If the requester's random number is not within the allocation fraction in block 408, and the requester is not currently receiving a distribution in block 410, the requester is left unchanged.

For the purposes of this specification and claims, the terms requester and client device are used interchangeably.

If the requester is currently receiving the distribution in block 410 but not within the allocation fraction in block 408, the current distribution may be paused in block 412. Such a situation may occur if an allocation fraction is changed from a large fraction to a small fraction, where the fraction is defined as the portion of requesters or client devices that may be permitted to receive the software distribution.

If the requester is within the allocation fraction in block 408 and the requester's distribution is currently paused in block 414, the distribution is continued in block 416. Such a situation may occur when an allocation fraction is was lowered, causing the client device to have the distribution paused, then the allocation fraction may be raised, allowing the distribution to continue.

If the requester is within the allocation fraction in block 408 and the requester's distribution is not paused in block 414, the distribution is started in block 418.

After each requester is processed in block 406, if a change in the allocation fraction is made in block 420, each requester is evaluated again starting in block 406.

The embodiment 400 is an example of a method by which software distributions may be started or paused.

In a typical use scenario, a software distribution may begin with a small fraction of client devices being able to receive the distribution. Over time, those client devices may complete the distribution and the fraction may be periodically raised higher until all of the requesters are able to receive the software distribution. During the distribution period, the allocation may be raised and lowered to respond to time policies, bandwidth restrictions, or other factors.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system having a processor and system memory, the computer system including a local group distribution manager, the local group distribution manager managing software distributions to a distribution group of assigned devices, a method for controlling a software distribution to a plurality of devices, the method comprising: for each device in the plurality of devices, receiving an assignment that the device is assigned to the distribution group;

receiving an indication that a software distribution is to be deployed from a distribution server to the distribution group, the software distribution also being deployed to one or more other distribution groups of devices;

accessing a distribution policy, the distribution policy defining the behavior of the local group distribution manager for deploying software distributions to the distribution group, including defining time-based resource restrictions applicable to deploying software distributions from the distribution server to the plurality of devices; accessing date/time information;

determining applicable resource restrictions for deploying the software distribution to a subset of the distribution group based on the accessed date/time information;

deploying the software distribution from the distribution server to the subset of the distribution group in accordance with the applicable resource restrictions, including allocating one or more of: bandwidth capacity and server capacity for the subset of the distribution group so as to control resource consumption associated with the distribution server, and subsequent to determining applicable resource restrictions for deploying the software distribution based on the accessed date/time information: accessing second date/time information, the second date/time information including at least a time of day for a geographic location;

adjusting applicable resource restrictions for deploying the software distribution based on the accessed second date/time information, including the at least a time of day for a geographic region; and deploying the software distribution from the distribution server to an adjusted subset of the distribution group by deploying the software distribution in accordance with the adjusted applicable resource restrictions.

2. The method of claim 1, wherein deploying the software distribution comprises pushing said software distribution to the selected subset of the plurality of devices.

3. The method of claim 1, wherein deploying the software distribution to a subset set of the distribution group comprising permitting a fraction of the distribution group to download the software distribution.

4. The method of claim 1, wherein deploying the software distribution from the distribution server to an adjusted subset of the distribution group comprises deploying the software distribution to an adjusted subset of the distribution group that includes more devices than the subset of the distribution group.

5. The method of claim 1, wherein deploying the software distribution from the distribution server to an adjusted subset of the distribution group comprises deploying the software distribution to an adjusted subset of the distribution group that includes fewer devices than the subset of the distribution group.

6. The method of claim 1, wherein deploying the software distribution from the distribution server to a subset of the distribution group comprises deploying a version of the software distribution, from among a plurality of versions of the software distribution, that includes content tailored for a geographic region.

7. The method of claim 5, wherein deploying the software distribution to an adjusted subset of the distribution group that includes fewer devices than the subset of the distribution group comprises halting an ongoing transfer of the software distribution to at least one of the plurality of devices prior to completion.

8. The method of claim 1, said software distribution comprising at least one of a group composed of: an operating system update; an application update; and a data file.

9. A computer readable storage device comprising computer executable code adapted to perform the method of claim 1.

10. The method of claim 1, further comprising:
for each of the plurality of devices:
determining a network address for the device;
determining a geographic location for the device based on the network address; and
assigning the device to the local group distribution manager based on the geographic location of the device.

11. The method of claim 1, wherein receiving an assignment that the device is assigned to the distribution group comprises receiving an assignment that the device is assigned to the distribution group based on the geographic location of the device, the geographic location of the device determined from a network address for the device.

12. The method of claim 1, further comprising:
determining second applicable resource restrictions for deploying the software distribution to a second subset of the distribution group based on the accessed date/time information; and
deploying the software distribution from the distribution server to the second subset of the distribution group in accordance with the second applicable resource restrictions, including allocating one or more of:
a second different bandwidth capacity and a second different server capacity for the second subset of the distribution group so as to control resource consumption associated with the distribution server.

13. A system for deploying software distributions, the system comprising: a processor; an address resolver that determines a network address for each of a plurality of clients; a location resolver that uses the network address to determine a geographic location for each of the plurality of clients;
a distribution engine; and
a plurality of local group distribution managers, each of the plurality of local group distribution managers associated with a geographic region; and
wherein the distribution engine is adapted to assign each of the plurality of clients to an appropriate local group distribution manager, selected from among the plurality of local group distribution managers, based on the determined geographic location of the client; and
wherein each of the plurality of local group distribution managers is adapted to:
receive an indication that a software distribution is to be deployed from a distribution server;
access a distribution policy, the distribution policy defining the behavior of the local group distribution manager for deploying software distributions, including defining time-based resource restrictions applicable to deploying software distributions to clients assigned to the local group distribution manager; access date/time information for the geographic region; determine applicable resource restrictions for deploying the software distribution based on the accessed date/time information; and
deploy the software distribution to a subset of the assigned clients in a controlled manner by deploying the software distribution in accordance with the applicable resource restrictions, including metering one or more of: bandwidth capacity and server capacity for the distribution server so as to control resource consumption associated with the distribution server; and
subsequent to determining applicable resource restrictions for deploying the software distribution based on the accessed date/time information:
access second date/time information, the second date/time information including at least a time of day for a geographic location;
adjust applicable resource restrictions for deploying the software distribution based on the accessed second date/time information, including the at least a time of day for a geographic region; and
deploy the software distribution from the distribution server to an adjusted subset of the assigned clients by deploying the software distribution in accordance with the adjusted applicable resource restrictions.

14. The system of claim 13, wherein each of the plurality of local group distribution managers being adapted to deploy the software distribution comprising each of the plurality of local group distribution managers being adapted to push the software distribution to assigned clients.

15. The system of claim 13, wherein each of the plurality of local group distribution managers being adapted to deploy the software distribution comprises each of the plurality of local group distribution managers being adapted to permit the software distribution to be downloaded by a fraction of the assigned clients.

16. The system of claim 13, further comprising, subsequent to determining applicable resource restrictions for deploying the software distribution based on the accessed date/time information, each of the plurality of local group distribution managers being adapted to:
access second date/time information for said geographic region;
adjust applicable resource restrictions for deploying the software distribution based on the accessed second date/time information; and
deploy the software distribution from the distribution server to an adjusted subset of the assigned clients in a controlled manner by deploying the software distribution in accordance with the adjusted applicable resource restrictions.

17. The system of claim 16, wherein each of the plurality of local group distribution managers being adapted to deploy the software distribution from the distribution server to an adjusted subset of the assigned clients comprises each of the plurality of local group distribution managers being adapted to deploy the software distribution to an adjusted subset of the assigned clients that includes fewer than the subset of the assigned clients.

18. The system of claim 17, wherein each of the plurality of local group distribution managers being adapted to deploy the software distribution to an adjusted subset of the assigned clients that includes fewer clients than the subset of the assigned clients comprises each of the plurality of local group distribution managers being adapted to halt an ongoing transfer for at least one client.

* * * * *